United States Patent
Lu et al.

(10) Patent No.: US 10,473,536 B2
(45) Date of Patent: Nov. 12, 2019

(54) GAP COMPENSATION FOR MAGNETOSTRICTIVE TORQUE SENSORS

(71) Applicant: Bently Nevada, LLC, Minden, NV (US)

(72) Inventors: Dan Tho Lu, Minden, NV (US); Brian F. Howard, Minden, NV (US); Pekka Tapani Sipila, Garching Bei Munchen (DE)

(73) Assignee: Bently Nevada, LLC, Minden, NV (US)

( * ) Notice: Subject to any disclaimer, the term of this patent is extended or adjusted under 35 U.S.C. 154(b) by 0 days.

(21) Appl. No.: 15/675,269

(22) Filed: Aug. 11, 2017

(65) Prior Publication Data

US 2019/0049320 A1   Feb. 14, 2019

(51) Int. Cl.
*G01L 1/00* (2006.01)
*G01L 1/12* (2006.01)
*G01V 3/10* (2006.01)

(52) U.S. Cl.
CPC ............. *G01L 1/125* (2013.01); *G01V 3/10* (2013.01)

(58) Field of Classification Search
CPC ................................. G01L 1/125; G01V 3/10
USPC .................................................... 73/862.325
See application file for complete search history.

(56) References Cited

U.S. PATENT DOCUMENTS

| | | |
|---|---|---|
| 2014/0366637 A1 | 12/2014 | Brummel et al. |
| 2015/0292962 A1* | 10/2015 | Lu .................... G01L 1/125 73/862.69 |
| 2016/0313415 A1* | 10/2016 | Ruff .................... G01R 33/1215 |
| 2016/0363488 A1* | 12/2016 | Sipila ...................... G01L 3/102 |
| 2018/0052065 A1* | 2/2018 | Sipila ...................... G01L 1/127 |
| 2018/0164396 A1* | 6/2018 | Folkner ................ G01R 35/005 |

FOREIGN PATENT DOCUMENTS

| | | |
|---|---|---|
| EP | 3290885 A1 | 3/2018 |
| WO | 2012/152720 A1 | 11/2012 |

OTHER PUBLICATIONS

European Search Report for Application No. 18188243.2, dated Jan. 18, 2019 (11 pages).

* cited by examiner

*Primary Examiner* — Max Noori
(74) *Attorney, Agent, or Firm* — Mintz Levin Cohn Ferris Glovsky and Popeo, P.C.

(57) ABSTRACT

A gap compensated torque sensing system and methods for using the same are provided. The system can include a sensor head in communication with a controller. The sensor head can contain a torque sensor and a proximity sensor coupled to the sensor head. The torque and proximity sensors can each sense magnetic fluxes passing through the target and a gap between the sensor head and the target. The controller can estimate torque applied to the target from magnetic fluxes sensed by the torque sensor. The controller can determine an improved gap measurement that is independent of electromagnetic properties of the target from magnetic fluxes sensed by the torque and proximity sensors. The estimated torque can be modified by the improved gap measurement to compensate for changes in magnetic properties of the target due to variations in the gap. In this manner, the accuracy of the torque measurements can be increased.

16 Claims, 5 Drawing Sheets

GAP COMPENSATION FOR MAGNETOSTRICTIVE TORQUE SENSORS

BACKGROUND

Sensors can be used in a variety of industries to monitor equipment. As an example, torque sensors can be used to monitor rotating machine components (e.g., shafts) and output signals representative of torque applied to the monitored components. By comparing measured torques to design specifications, it can be determined whether monitored components are operating within these specifications.

Magnetostrictive torque sensors are a type of sensor that employs magnetic fields for measuring torque. In general, magnetostriction is a property of ferromagnetic materials that characterizes changes in shape (e.g., expansion or contraction) of the material in the presence of a magnetic field. Conversely, magnetic properties of a ferromagnetic material, such as permeability (the capability to support development of a magnetic field within the material) can change in response to torque applied to the material. A magnetostrictive torque sensor can generate magnetic flux that permeates a shaft and it can sense the magnetic flux as it interacts with the shaft. As an amount of torque applied to the shaft changes, a magnetostrictive sensor can output signals representative of torques applied to the shaft based upon the sensed magnetic flux.

However, the distance or gap separating a magnetic torque sensor and a monitored component can change due to vibrations and/or variations in shape of the monitored component during rotation. These changes in distance can cause variations in the magnetic flux sensed by a magnetostrictive torque sensor that are independent of applied torque. Consequently, torque measurements acquired by magnetostrictive torque sensors based upon sensed magnetic flux can deviate from actual torque on a shaft.

SUMMARY

In general, systems and methods are provided for gap compensation of magnetostrictive sensors, such as torque sensors.

In one embodiment, a magnetostrictive sensor is provided and it can include a sensor head including a driving pole, two magnetic sensors coupled to respective sensing poles, and a proximity coil. The driving pole can have a driving coil coupled thereto that can be configured to generate magnetic fluxes in response to a driving current. The two magnetic sensors can each be configured to output a first signal based at least upon first magnetic fluxes and second magnetic fluxes sensed by the two magnetic sensors. The first sensed magnetic fluxes can result from interaction of the generated magnetic fluxes with a target, a gap between the sensor head and the target, and the two sensing poles and the second sensed magnetic fluxes resulting from interaction of the generated magnetic fluxes with the gap. The proximity coil can be coupled to the driving pole and it can be configured to output a second signal based at least upon the first magnetic fluxes, the second sensed magnetic fluxes, and third magnetic fluxes sensed by the proximity coil. The third magnetic fluxes can result from interaction of the generated magnetic fluxes with the gap.

In another embodiment, the sensor can include a controller in electrical communication with the sensor head. The controller can be configured to receive the first signals and the second signal, determine a force applied to the target based upon the first signals, determine the gap based upon the first signals and the second signal, and adjust the force determined from the first signals based upon the gap determined from the first signals and the second signal.

In another embodiment, the force can be a torque.

In another embodiment, the two magnetic sensors can be arranged approximately symmetrically with respect to the driving pole.

In another embodiment, the third sensed magnetic flux can be approximately independent of electromagnetic properties of the target.

In another embodiment, the second and third magnetic fluxes can avoid impinging the target.

Methods for measuring proximity of a target are also provided. In one embodiment, the method can include generating magnetic fluxes that extend through a first region, a second region, and a third region, the first region including a target, a pair of first sensors, and a second sensor, the second region including the pair of first sensors and the second sensor, and the third region including the second sensor, measuring, by the pair of first sensors, a combination of the first magnetic fluxes resulting from interaction of the generated magnetic fluxes and the target and second magnetic fluxes resulting from interaction of the generated magnetic fluxes and a gap between the second sensor and the target and measuring, by the second sensor, a combination of the first magnetic fluxes, the second magnetic fluxes, and third magnetic fluxes, the third magnetic fluxes resulting from interaction of the generated magnetic fluxes and the gap.

In one embodiment, the method can also include determining the third magnetic fluxes based upon combination of the first and second magnetic fluxes measured by the pair of first sensors and the first, second, and third magnetic fluxes measured by the second sensor and determining the gap based upon the third magnetic fluxes.

In another embodiment, the third magnetic flux can be approximately independent of electromagnetic properties of the target.

In another embodiment, the second and third magnetic fluxes can avoid impinging the target.

In another embodiment, each of the first and second sensors can be inductive sensors configured to output a signal based upon magnetic fields respectively extending therethrough.

In another embodiment, the pair of first sensors can be positioned approximately symmetrically with respect to a source of the generated magnetic flux.

Methods for compensating torque measurements for gap variations are also provided. In one embodiment, the method can include generating magnetic fluxes with a driving coil coupled to a driving pole of a magnetostrictive torque sensor, outputting, by two magnetic sensors coupled to respective sensing poles of the magnetostrictive sensor, first signals based at least upon first magnetic fluxes and second magnetic fluxes sensed by the two magnetic sensors, where the first sensed magnetic fluxes can result from interaction of the generated magnetic fluxes with a target, a gap between the magnetostrictive torque sensor and the target, and the two sensing poles and the second sensed magnetic fluxes can result from interaction of the generated magnetic fluxes with the gap and the two sensing poles, and outputting, by a proximity coil coupled to the driving pole, a second signal based at least upon a combination of the first magnetic fluxes, the second sensed magnetic fluxes, and third magnetic fluxes sensed by the proximity coil, the third magnetic fluxes can result from interaction of the generated magnetic fluxes with the gap.

In one embodiment, the method can also include determining a torque applied to the target based upon the first signals, determining the gap based upon the first signals and the second signal, and adjusting the torque determined from the first signals based upon the gap determined from the first signals and the second signal.

In another embodiment, the force can be a torque.

In another embodiment, the two magnetic sensors can be arranged approximately symmetrically with respect to the driving pole.

In another embodiment, the third sensed magnetic flux can result from interaction of the generated magnetic flux with the gap only.

In another embodiment, the second and third magnetic fluxes can avoid impinging the target.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

Certain exemplary embodiments will now be described to provide an overview of the principles of the structure, function, manufacture, and use of the systems, devices, and methods disclosed herein. One or more examples of these embodiments are illustrated in the accompanying drawings. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Magnetostrictive sensors, such as torque sensors, can include a driving element that generates a magnetic flux and a sensing element that measures the magnetic flux as it interacts with a target (e.g., a rotating machine shaft) in order to determine torque applied to the shaft. In some instances, the magnetic flux sensed by the sensing element can be highly sensitive to changes in the distance or gap from the target, and these gap variations can introduce error into torque measurements determined from the sensed magnetic flux. To improve the quality of torque measurements, changes in the gap can be measured to compensate torque measurements for gap variations. As an example, non-contact proximity sensors can be used to determine the gap from measurements of the magnetic flux generated by a magnetorestrictive sensor. However, the accuracy of gap measurements acquired by these non-contact proximity sensors can be compromised by changes in electromagnetic properties of the target that cause sensed magnetic fields to vary independently of the gap. Accordingly, improved gap compensation measurements that isolate changes in measured magnetic flux due to gap changes from changes in measured magnetic flux due to electromagnetic characteristics of the target are provided for use with magnetorestrictive torque sensors to enhance the accuracy of torque measurements.

Embodiments of sensing systems and corresponding methods for measuring torque of rotating machine components are discussed herein. However, embodiments of the disclosure can be employed to measure other forces applied to rotating or stationary machine components without limit.

Figure 1:
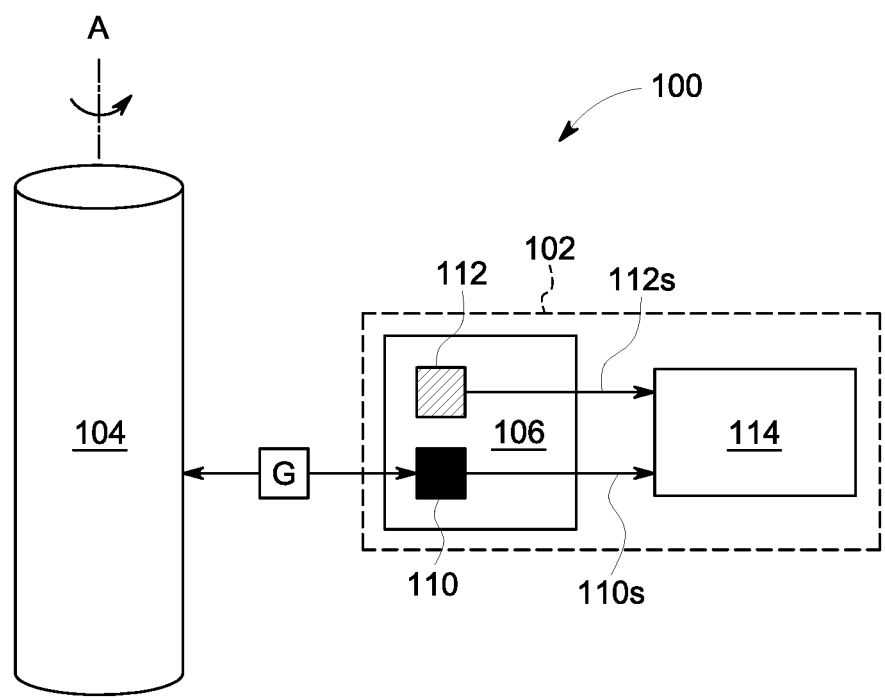
FIG. 1 is a diagram illustrating one exemplary embodiment of an operating environment including a magnetostrictive torque sensor having a sensor head including a torque sensor and a proximity sensor.

FIG. 1 illustrates one exemplary embodiment of an operating environment 100 containing a gap compensated torque sensing system 102 and a target 104. The gap compensated torque sensing system 102 can be a magnetostrictive torque sensing system including a sensor head 106, a torque sensor 110, a proximity sensor 112, and a controller 114. The torque sensor 110 can be positioned within the sensor head 106 and it can be configured to generate first signals 110s representative of torque applied to a selected portion of the target 104. The proximity sensor 112 can also be positioned within the sensor head 106 and it can be configured to generate second signals 112s representative of a gap G between itself and the selected portion of the target 104.

In use, the sensor head 106 can be positioned proximate to the target 104 for acquiring torque and gap measurements. The controller 114 can be configured to receive the first and second signals 110s, 112s and it can determine a torque applied to the selected portion of the target 104. The controller 114 can also measure a gap G that is approximately independent of variations in the electromagnetic properties of the target 104. From the first signals 110s and the measured gap G, the controller 114 can adjust the torque determined by the torque sensor 110 to compensate for changes in the gap G (e.g., due to vibration and/or geometry variations of the target). In this manner, the accuracy of the torque measurements can be increased.

In certain embodiments, the sensor head 106 can be coupled to a frame or other stationary fixture (not shown) to position the sensor head 106 at a desired orientation and/or position with respect to the target 104. In other embodiments, the torque and gap measurements can be acquired from the target 104 while the target 104 is rotating (e.g., about a longitudinal axis A) or while the target is stationary. Other embodiments are within the scope of the disclosed subject matter.

Figure 2:
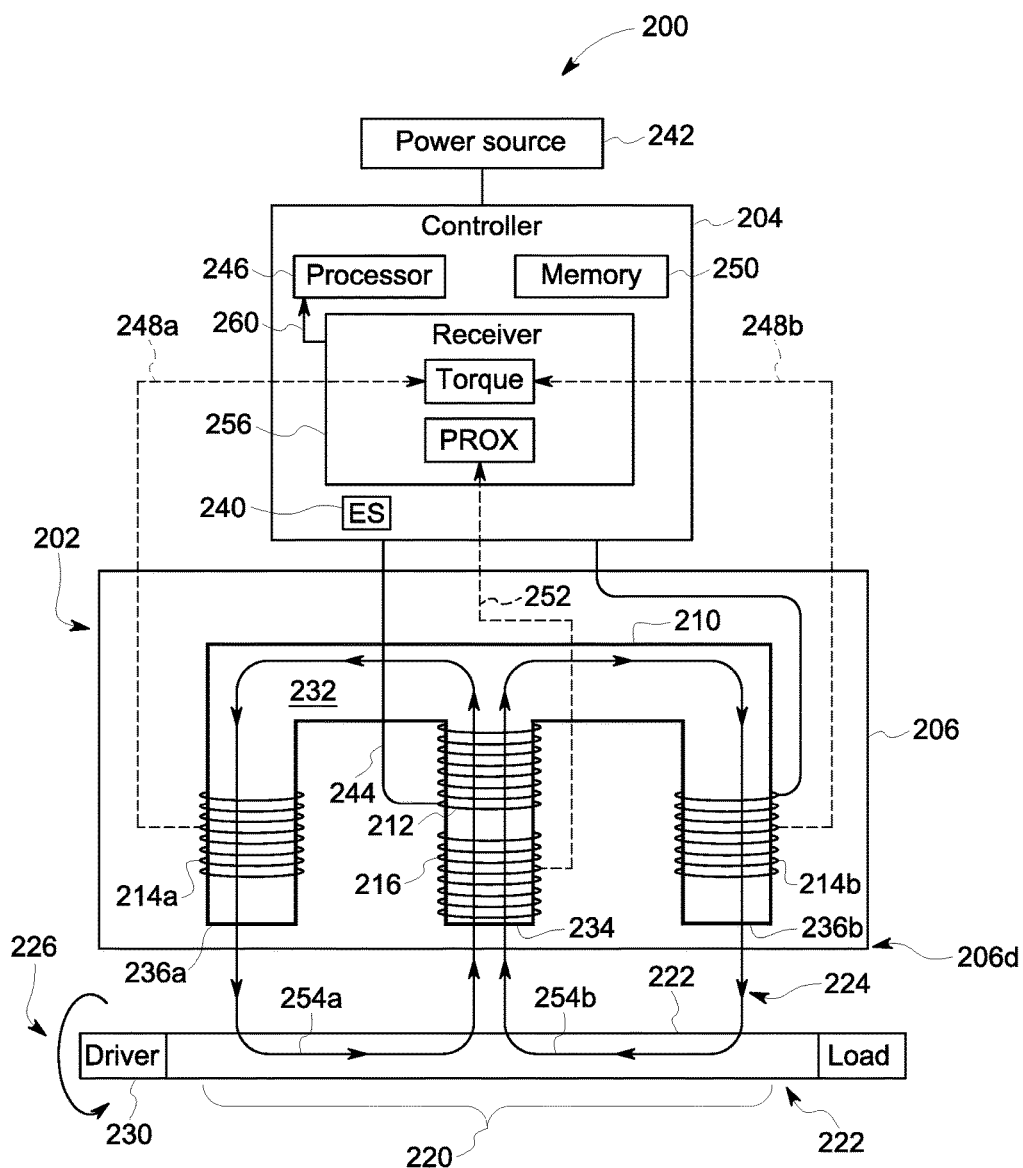
FIG. 2 is a side cross-sectional view of one exemplary embodiment of a magnetostrictive torque sensor of FIG. 1 including a sensor head having a core, a driving coil, two or more magnetic sensors, and a proximity sensor.

FIG. 2 is a side cross-sectional view of one exemplary embodiment of a gap compensated torque sensing system 200 that includes a sensor head 202 in electrical communication with a controller 204. The sensor head 202 can form a housing 206 that contains a torque sensor including a core 210, a driving coil 212, and two or more magnetic sensors (e.g., sensing coils 214a, 214b). The sensor head 202 can also include a proximity sensor including a proximity coil 216. As discussed in greater detail below, the torque sensor can be configured to measure torque applied to a selected portion 220 of a target 222 (e.g., a portion of the target 222 positioned opposite the sensor head 202). The proximity sensor can be configured to measure a gap 224 between the sensor head 202 (e.g., a distal end 206d of the housing 206) and the selected portion 220 of the target 222 concurrently with the torque measurements acquired by the torque sensor.

The target 222 can be a component of any machine or equipment 226 that is configured to rotate. Examples of rotating components can include, but are not limited to, shafts and rotors. Examples of machines and equipment 226 incorporating rotating components can include, but are not limited to, turbomachines (e.g., turbine engines, compressors, pumps, and combinations thereof), generators, combustion engines, and combinations thereof. Force or load can be applied to the target 222 by a driver 230 (e.g., a reciprocating engine, a combustion engine, a turbine engine, an electrical motor, etc.) to enable the target 222 to rotate and drive a load. The target 222 can be formed from materials including, but not limited to, ferromagnetic materials such as iron, steel, nickel, cobalt, and alloys thereof. In certain embodiments, the target 222 can be non-magnetized. In other embodiments, the target 222 can be magnetized.

The core 210 can include a base 232 and at least three elongated poles 234, 236a, 236b. The poles 234, 236a, 236b can extend outwards from the base 232 and they can be separated from one another by a selected distance. The core 210 can be formed from any ferromagnetic material. Examples can include, but are not limited to, iron, steel, nickel, cobalt, and alloys thereof. One of the poles 234 can be a driving pole to which the driving coil 212 is wrapped around. The poles 236a, 236b can be sensing poles to which the sensing coils 214a, 214b are wrapped around. In certain embodiments, the sensing poles 236a, 236b can be positioned approximately symmetrically about the driving pole 234.

The driving coil 212 and the sensing coils 214a, 214b can each be in electrical communication with the controller 204. As shown in FIG. 2, the controller 204 can be electrically coupled to an excitation source ES 240 by wired or wireless connections. Wireless communication devices, such as radio frequency (RF) transmitters, can be integrated with the controller 204 to transmit the signals to an RF receiver integrated with the excitation source ES 240. As also shown in FIG. 2, the controller 204 can be positioned remotely from the sensor head 202. However, in alternative embodiments (not shown), the controller 204 can be positioned within the sensor head 202.

A power source 242 (e.g., electrical outlet, electrical generator, battery, etc.) can provide power to the controller 204 and the excitation source ES 240. The excitation source ES 240 can be configured to deliver a driving current 244 (e.g., an AC current) to the driving coil 212 and the controller 204 can be configured to control characteristics of the driving current 244 delivered to the driving coil 212 (e.g., frequency, amplitude, etc.) by the excitation source ES 240. The controller 204 can be any computing device employing a general purpose or application-specific processor 246. In either case, the controller 204 can include memory 250 for storing instructions related to characteristics of the driving current 244, such as frequency, amplitude, and combinations thereof. The memory 250 can also include instructions and algorithms for employing sensor signals (e.g., torque signals 248a, 248b and proximity signal 252) to determine torque measurements, improved gap measurements, and compensating torque measurements based on the improved torque measurements, as discussed in greater detail below. The processor 246 can include one or more processing devices, and the memory 250 can include one or more tangible, non-transitory, machine-readable media collectively storing instructions executable by the processor 246 to perform the methods and control actions described herein.

The driving current 244 can pass through the driving coil 212 to generate magnetic fluxes 254a, 254b. At least a portion of the magnetic fluxes 254a, 254b can permeate the core 210 and the target 222, pass through the sensing coils 214a, 214b and the proximity coil 216, and return to the driving coil 212 via the core 210 (e.g., the sensing poles 236a, 236b). In this manner, a magnetic loop can be formed through the torque sensor and the target 222. As discussed in greater detail below, additional magnetic fluxes having spatial distributions different from the magnetic fluxes 254a, 254b can also be present.

The sensing coils 214a, 214b can be used to measure magnetic fluxes 254a, 254b exiting the target 222. Because force (e.g., compression, tension, torsion, etc.) applied to the target 222 can change the magnetic permeability of the target 222, magnetic fluxes 254a, 254b sensed by the sensing coils 214a, 214b can change. Thus, the torque applied to the target 222 can be determined based on changes in the magnetic fluxes 254a, 254b sensed by the sensing coils 214a, 214b relative to the magnetic fluxes 254a, 254b generated by the driving coil 212. The sensing coils 214a, 214b can be configured to transmit torque signals 248a, 248b indicative of the changes (e.g., differences) in the magnetic fluxes 254a, 254b to the controller 204. Under circumstances where the sensing poles 236a, 236b are positioned symmetrically with respect to the driving pole 234, the magnetic fluxes 254a, 254b sensed by the sensing coils 214a, 214b can be the same, resulting in the generated torque signals 248a, 248b also being the same.

In an alternative embodiment, the magnetic fluxes 254a, 254b exiting the target 222 can be measured by secondary magnetic sensors (not shown) other than the sensing coils 214a, 214b. The secondary magnetic sensors can be configured similarly to the sensing coils 214a, 214b and they can transmit torque signals 248a, 248b indicative of the changes (e.g., differences) in the magnetic fluxes 254a, 254b to the controller 204. In contrast to the sensing coils 214a, 214b, the secondary magnetic sensors can be located off of the sensing poles 236a, 236b and instead coupled to the sensing poles 236a, 236b by a coupling formed from a material that does not interfere with the magnetic fluxes 254a, 254b. That is, the secondary magnetic sensors can be coils or any other magnetic sensor capable of measuring the magnetic fluxes 254a, 254b exiting the target 222. The position of the secondary magnetic sensors can be approximately symmetric with respect to the driving pole 234.

The torque signals 248a, 248b can be communicated by wired or wireless connections to the controller 204 (e.g., receiver 256). As an example, wireless communication devices, such as RF transmitters, can be integrated with the sensor head 202 (e.g., proximate to the sensing coil 214) to transmit the signals to an RF receiver integrated with the controller 204. The receiver 256 can include electronic components (e.g., amplifiers, filters, etc.) that can condition the torque signals 248a, 248b before transmitting them to the processor 246 (e.g., 260). In other embodiments, the torque signals 248a, 248b can be conditioned after being processed by the processor 246.

Upon receipt of the torque signals 248a, 248b from the sensing coils 214a, 214b, the processor 246 can process the torque signals 248a, 248b to estimate the torque applied to the target 222. That is, the processor 246 can execute pre-stored and/or user-defined algorithms in the memory 250 to calculate the magnitude of the torque applied to the target 222 based on the characteristics of the target 222, the sensor head 202, and the driving current 244.

As discussed above, the torque measurements can be affected by the gap 224. Thus, torque measurements determined for the target 222 based upon magnetic fluxes 254a, 254b sensed by the torque sensor can deviate from the actual torque applied to the target 222. To address this issue, the gap 224 can be measured by the proximity sensor (e.g., the proximity coil 216) and it can be used to adjust the torque measurements to account for variations in the gap 224. In this manner, the proximity sensor can improve the accuracy of the torque measurements and enable better control of the machine or equipment 226 incorporating the target 222.

The position of the proximity coil 216 relative to the target 222 can be selected to facilitate both the torque measurements acquired by the torque sensor and the gap measurements acquired by the proximity coil 216. As shown in FIG. 2, the proximity sensor can be an inductive proximity sensor and the proximity coil 216 can be positioned on the driving pole 234. In certain embodiments, the proximity coil 216 can be positioned distally of the driving coil 212 on the driving pole 234. So positioned, the proximity coil 216 can act as an inductive pick-up coil, transmitting proximity signals 252 representative of the gap 224 based upon changes in the magnetic fluxes 254a, 254b.

The proximity signal 252 can be communicated by wired or wireless connections to the controller 204 (e.g., receiver 256). As an example, wireless communication devices, such as RF transmitters, can be integrated with the sensor head 202 (e.g., proximate to the sensing coil 214) to transmit the signals to an RF receiver integrated with the controller 204. The receiver 256 can include electronic components (e.g., amplifiers, filters, etc.) that can condition the proximity signal 252 before transmitting the proximity signal 252 to the processor 246. In other embodiments, the torque signal 248 can be conditioned after being processed by the processor 246.

Upon receipt of the proximity signal 252 from the proximity coil 216, the processor 246 can process the proximity signal 252 and determine the gap 224. That is, the processor 246 can execute pre-stored and/or user-defined algorithms in the memory 250 to calculate the magnitude of the gap 224. However, employing the proximity signal 252 alone to determine the gap 224 can compromise the accuracy of the gap measurement. As discussed above, the magnetic fluxes 254a, 254b can be influenced both by the electromagnetic properties of the target 222 and the gap 224. In one aspect, the electromagnetic properties of the target 222 can vary due to applied forces (e.g., torque, bending, thrust, etc.). In another aspect, electromagnetic properties of the target 222 can vary due to inhomogeneity in the chemical composition of the target 222, that is, electromagnetic runout. These inhomogeneities can arise from the formation of rust or other chemical reactions at the surface of the target 222.

To address this issue, the torque signals 248a, 248b can be combined with the proximity signal 252 to provide an adjusted or improved proximity signal that can be independent of the electromagnetic properties of the target 222 and it can more accurately represent the gap 224 than the proximity signal 252. As discussed in detail below, this adjustment can be accomplished due to symmetry of the sensing coils 214a, 214b and spatial distribution of magnetic fluxes generated by the driving coil 212.

Figure 3:
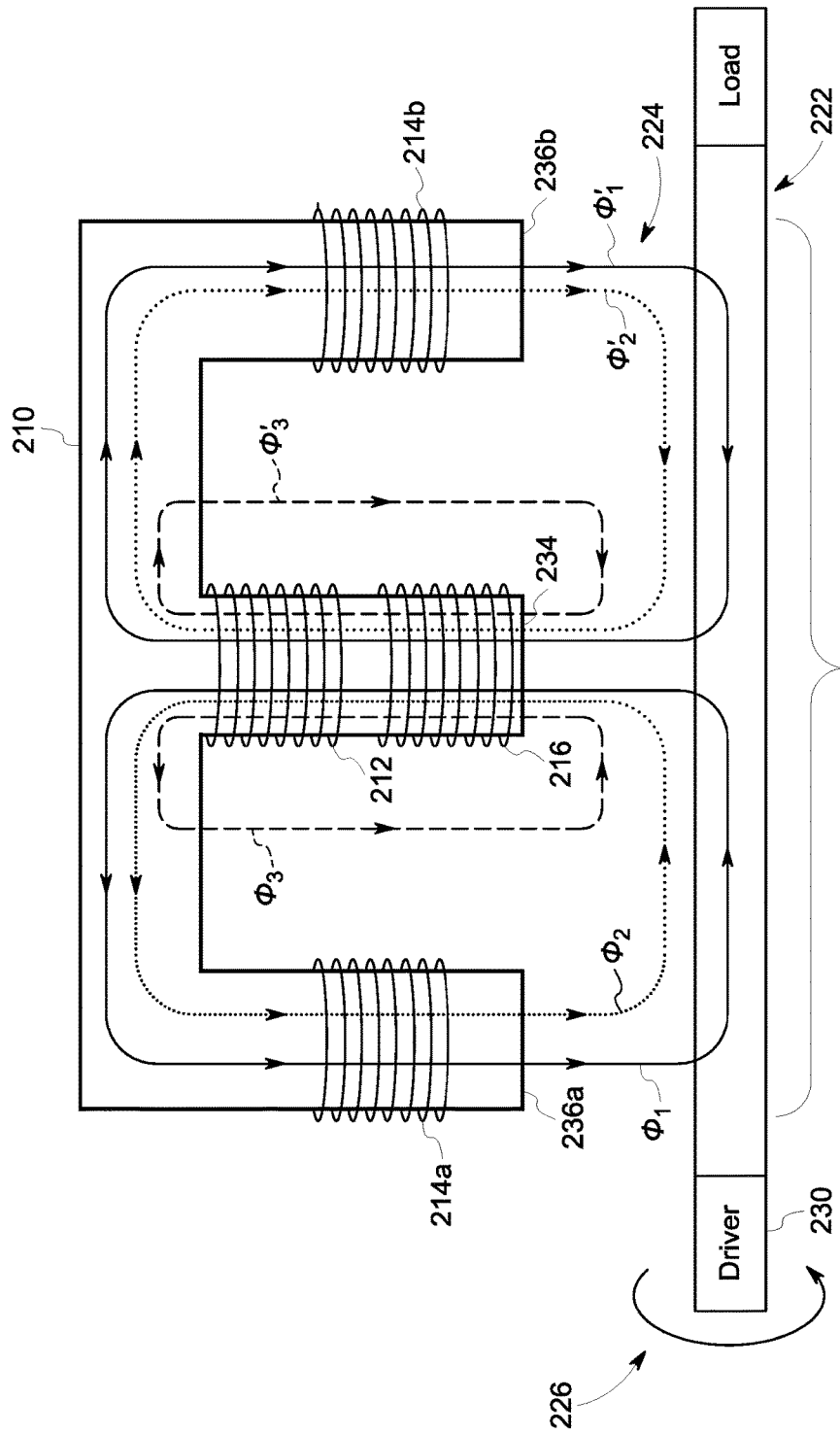
FIG. 3 is a side cross-sectional view of the sensor head of FIG. 2 illustrating the spatial distribution magnetic flux generated by driving coil.

FIG. 3 shows the sensor head 202, illustrating the magnetic fluxes 254a, 254b in greater detail. The housing 206 is omitted for clarity. As shown, the magnetic fluxes 254a, 254b can be partitioned into different components (e.g., $\Phi_1$, $\Phi'_1$, $\Phi_2$, $\Phi'_2$, $\Phi_3$, and $\Phi'_3$) based upon their spatial distribution. Each of the magnetic flux components can be dependent upon the electromagnetic properties of the target 222, interchangeably referred to below as $\delta$, the gap 224, interchangeably referred to below as g, or both. $\delta$ can represent the effects of stress induced by torque, varying magnetic permeability, and/or electrical conductivity (e.g., electromagnetic runout).

Magnetic fluxes $\Phi_1$ and $\Phi'_1$ can form loops passing through the core 210 (e.g., the base 232, the driving pole 234, and the sensing poles 236a, 236b, respectively), the gap 224, and the target 222. As a result, the magnetic fluxes $\Phi_1$ and $\Phi'_1$ can each be a function of both the electromagnetic properties of the target 222 and the gap 224. Symbolically, the magnetic fluxes $\Phi_1$ and $\Phi'_1$ can be represented by the equations $\Phi_1 = f_1(\delta, g)$ and $\Phi'_1 = f'_1(\delta, g)$, where $f_1$ and $f'_1$ are functional dependences of $\Phi_1$ and $\Phi'_1$ on g, respectively.

Magnetic fluxes $\Phi_2$ and $\Phi'_2$ can form loops passing through the core 210 (e.g., the base 232, the driving pole 234, and the sensing poles 236a, 236b, respectively) and the gap 224 but not the target 222. Thus, the magnetic fluxes $\Phi_2$ and $\Phi'_2$ have a different spatial distribution from the magnetic fluxes $\Phi_1$ and $\Phi'_1$, which causes the magnetic fluxes $\Phi_2$ and $\Phi'_2$ to be dependent only on the value of the gap 224. Symbolically, the magnetic fluxes $\Phi_2$ and $\Phi'_2$ can be represented by the equations $\Phi_2 = f_2(g)$ and $\Phi'_2 = f'_2(g)$, where $f_2$ and $f'_2$ are the functional dependences of $\Phi_2$ and $\Phi'_2$ on g, respectively.

Magnetic fluxes $\Phi_3$ and $\Phi'_3$ can form loops passing through a portion of the core 210 (e.g., the base 232 and the driving pole 234) and the gap 224 but not the sensing poles 236a, 236b or the target 222. As a result, the magnetic fluxes $\Phi_3$ and $\Phi'_3$ can be functions only of g. However, because the magnetic fluxes $\Phi_3$ and $\Phi'_3$ have a different spatial distribution from the magnetic fluxes $\Phi_2$ and $\Phi'_2$, they adopt different values. Symbolically, the magnetic flux $\Phi_3$ can be represented by the equations $\Phi_3 = f_3(g)$ and $\Phi'_3 = f'_3(g)$, where $f_3$ and $f'_3$ are the functional dependence of $\Phi_3$ and $\Phi'_3$ on g.

Owing to its position on the sensing pole 236a, the torque signal 248a can result from voltage induced within the sensing coil 214a by the magnetic fluxes $\Phi_1$ and $\Phi_2$. Thus, the torque signal 248a, referred to as $U_{1sense}$ below, can be represented symbolically as a function that is proportional to sum of the magnetic fluxes $\Phi_1$ and $\Phi_2$, given by $U_{1sense} = a(\Phi_1 + \Phi_2)$, where a is a proportionality constant.

Owing to its position on the sensing pole 236b, torque signal 248b can result from voltage induced within the sensing coil 214b by the magnetic fluxes $\Phi'_1$ and $\Phi'_2$. Thus, the torque signal 248b, referred to as $U_{2sense}$ below, can be represented symbolically as a function that is proportional to sum of the magnetic fluxes $\Phi'_1$ and $\Phi'_2$, given by $U_{2sense} = a(\Phi'_1 + \Phi'_2)$.

Owing to its position on the driving pole 234, the proximity signal 252 can result from voltage induced within the proximity coil 216 by the magnetic fluxes $\Phi_1$, $\Phi'_1$, $\Phi_2$, $\Phi'_2$, $\Phi_3$, and $\Phi'_3$. Thus, the proximity signal 252, referred to as $U_{prox}$ below, can be represented symbolically as a function that is proportional to sum of the magnetic fluxes $\Phi_1$, $\Phi'_1$, $\Phi_2$, $\Phi'_2$, $\Phi_3$ and $\Phi'_3$, given by $U_{prox} = b(\Phi_1 + \Phi'_1 + \Phi_2 + \Phi'_2 + \Phi_3 + \Phi'_3)$, where b is a proportionality constant.

It can be assumed that $U_{1sense}$ is approximately equal to $U_{2sense}$, owing to the symmetry of the sensing poles 236a, 236b with respect to the driving pole 234. Additionally, the proportionality constants a and b can be set to be equal, either numerically or by electronics of the torque sensor and the proximity sensor.

Based upon these assumptions, the controller 204 (e.g., the processor 246) can determine an adjusted or improved proximity signal $U_{prox\_imp}$ that depends only upon g using the torque signals 248a, 248b and the proximity signal 252. As an example, the processor 246 can subtract $U_{prox}$ (the proximity signal 252) from the sum of $U_{1sense}$ and $U_{2sense}$ (the sum of torque signals 248a, 248b) That is, the controller 204 can combine $U_{1sense}$, $U_{2sense}$, and $U_{prox}$ in such a manner that functions dependent upon 6 are eliminated, leaving only functions dependent upon g.

$$U_{prox\_imp} = U_{1sense} + U_{2sense} - U_{prox}$$

$$U_{prox\_imp} = a(\Phi_1 + \Phi_2) + a(\Phi'_1 + \Phi'_2) - b(\Phi_1 + \Phi'_1 + \Phi_2 + \Phi'_2 + \Phi_3 + \Phi'_3)$$

$$U_{prox\_imp} = a(\Phi_1 + \Phi_2) + a(\Phi'_1 + \Phi'_2) - a(\Phi_1 + \Phi'_1 + \Phi_2 + \Phi'_2 + \Phi_3 + \Phi'_3)$$

$$U_{prox\_imp} = a(\Phi_3 + \Phi'_3) = f_4(g)$$

Upon determining the improved proximity signal $U_{prox\_imp}$, the processor 246 can execute pre-stored and/or user-defined algorithms in the memory 250 to process the improved proximity signal $U_{prox\_imp}$ and the torque signals 248a, 248b and determine a gap compensated torque measurement that is improved over a measurement of the torque based only upon the torque signals 248a, 248b or a measurement of the torque compensated by the proximity signal 252.

While the sensor head of FIG. 2 illustrates a gap compensated torque sensing system 200 including a core 210 having the two sensing poles 236a, 236b, alternative embodiments of the core can include any different numbers of sensing poles (e.g., 2, 3, 4, 5, 6, 7, 8, 9, 10), provided that at least two of the sensing poles are arranged symmetrically with respect to a driving pole and include sensing coils to facilitate determination of the improved proximity signal $U_{prox\_imp}$.

Figure 4:
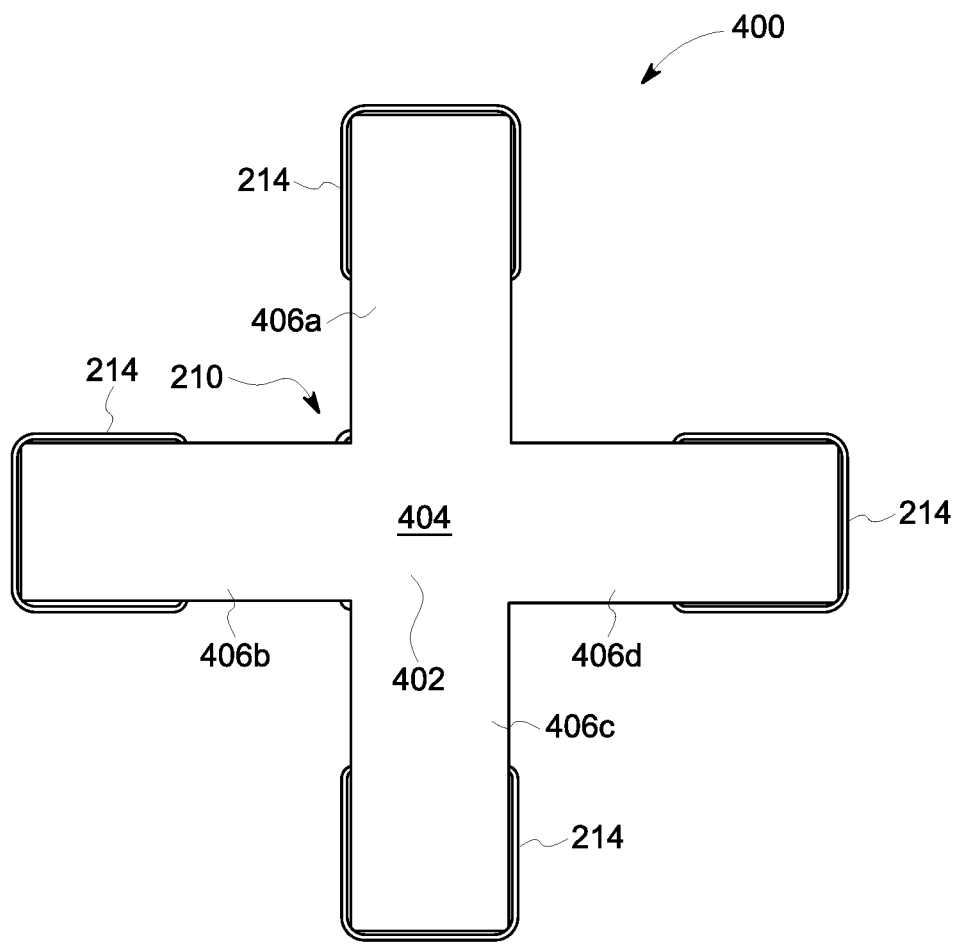
FIG. 4 is a top view of an exemplary embodiment of a core of the magnetostrictive torque sensor of FIG. 2.

As an example, FIG. 4 is a top view of an exemplary embodiment of a core 400 suitable for use with the gap compensated torque sensing system 200. As shown, the core 400 can include a cross axis yoke 402 having a cross yoke portion 404 and four bases 406a, 406b, 406c, 406d. The bases 406a, 406b, 406c, 406d can extend radially outward in a plane from the cross yoke portion 404 in any configuration and for any length that enables each to operate as described herein. The bases 406a, 406b, 406c, 406d can be angularly spaced apart by an angle ranging from about 10 degrees to 135 degrees (e.g., 10 degrees, 20 degrees, 30 degrees, 40 degrees, 45 degrees, 60 degrees, 75 degrees, 90 degrees, 120 degrees, 135 degrees, or any combination thereof). As shown in FIG. 4, the bases 406a, 406b, 406c, 406d can be angularly spaced apart by approximately 90 degrees. Additional embodiments of the sensor head and the torque sensor are discussed in U.S. Pat. No. 9,618,408, the entirety of which is hereby incorporated by reference.

Figure 5:
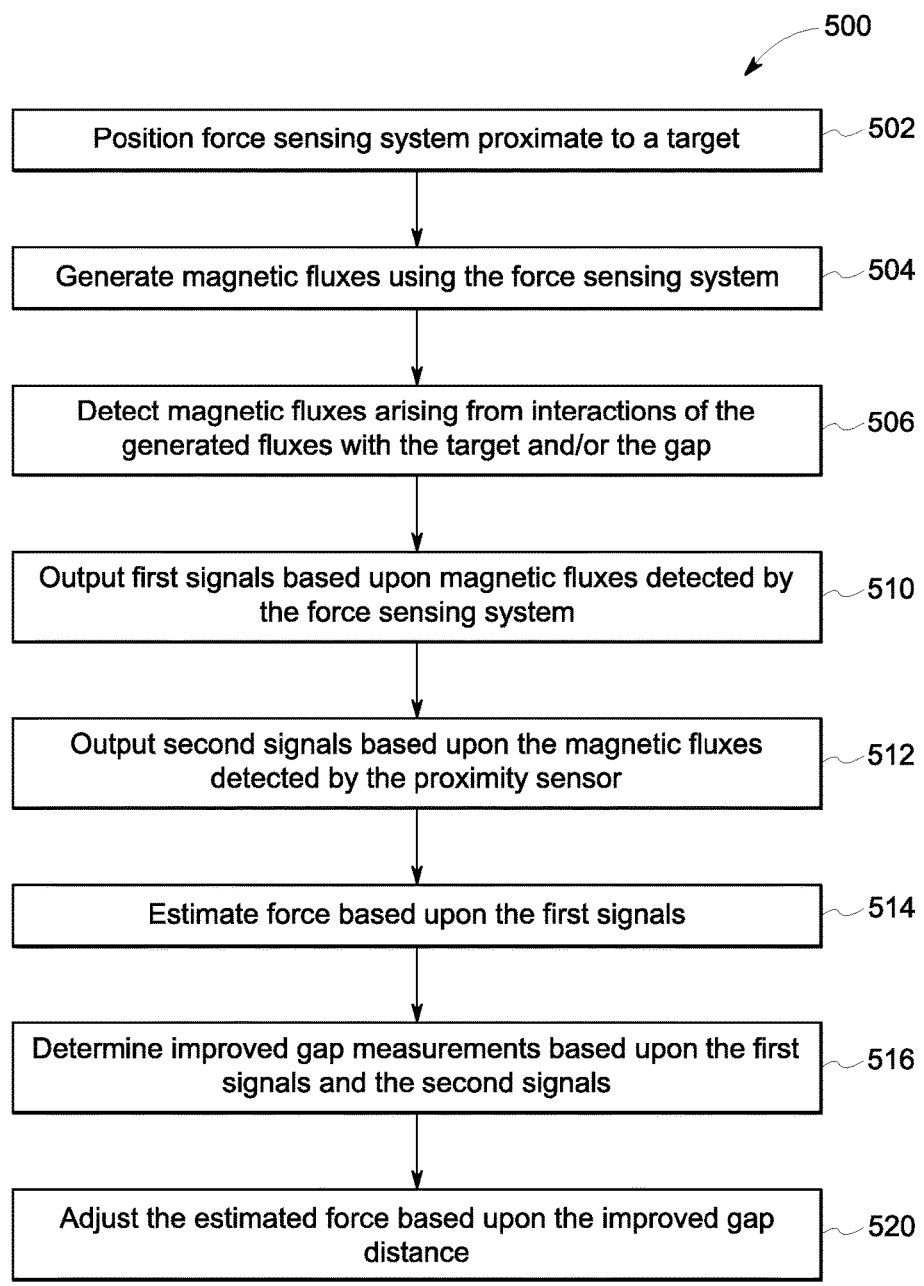
FIG. 5 is a flow diagram illustrating an exemplary embodiment of a method for measuring torque and proximity of a target.

FIG. 5 is a flow diagram illustrating an exemplary embodiment of a method 500 for measuring force (e.g., torque) and proximity of a target (e.g., 222) using any of the sensing systems discussed herein. The method 500 is described below in connection with the gap compensated torque sensing system 200 of FIG. 2. However, the method 500 is not limited to use with the gap compensated torque sensing system 200 and it can be employed with any magnetostrictive torque sensor. In certain aspects, embodiments of the method 500 can include greater or fewer operations than illustrated in FIG. 5 and can be performed in a different order than illustrated in FIG. 5.

In operation 502, a gap compensated torque sensing system (e.g., 200) can be positioned proximate to a target (e.g., 222). As discussed above, the gap compensated torque sensing system 200 can include the torque sensor and the proximity sensor.

In operation 504, magnetic fluxes can be generated by the gap compensated torque sensing system 200 (e.g., by driving coil 212). A first portion of the generated magnetic fluxes can be directed through each of the driving pole 234, the sensing poles 236, the gap 224, and the target 222 (e.g., $\Phi_1$ and $\Phi_2$). A second portion of the generated magnetic fluxes can be directed through the driving pole 234, the sensing poles 236, and the gap 224, and but not the target 222 (e.g., $\Phi'_2$ and $\Phi'_2$). A third portion of the generated magnetic fluxes can be directed through the driving pole 234 and the gap 224 but not the sensing poles 236a, 236b or the target 222 (e.g., $\Phi_3$ and $\Phi'_3$).

In operation 506, magnetic fluxes representing a net interaction of the generated magnetic fluxes with the target 222 and/or the gap 224, can be sensed by the torque sensor (e.g., the sensing coils 214a, 214b) and/or the proximity sensor (e.g., proximity coil 216). As an example, first magnetic fluxes (e.g., $\Phi_1$ and $\Phi'_1$) can be sensed by the torque sensor and the proximity sensor and they can represent net interactions of the generated magnetic flux with the target 222 and the gap 224. Second magnetic fluxes (e.g., $\Phi_2$ and $\Phi'_2$) can be sensed by the torque sensor and the proximity sensor and they can represent net interactions of the generated magnetic flux with the gap 224 alone. Third magnetic fluxes (e.g., $\Phi_3$ and $\Phi'_3$) can be sensed by the proximity sensor and they can represent net interactions of the third portion of the first magnetic flux with the gap 224 alone that is sensed by the proximity sensor (e.g., proximity coil 216) but not sensed by the torque sensor.

In operation 510, first signals (e.g., torque signals 248a, 248b) can be output by the torque sensor based upon the first and second magnetic fluxes sensed by the torque sensor.

In operation 512, second signal (e.g., proximity signal 252) can be output by the proximity sensor based upon the first, second, and third magnetic fluxes measured by the proximity sensor. The second signals can depend upon both a gap between a selected portion of the target 222 (e.g., 220) and electromagnetic properties of the target 222.

In operation 514, torque applied to the target 222 can be determined from the first signals 248a, 248b.

In operation 516, an improved gap measurement can be determined from the first signals 248a, 248b and the second signal 252. The improved gap measurement can be approximately independent of the electromagnetic properties of the target 222. That is, the improved gap measurement can be substantially dependent only upon the gap 224.

In operation 520, a gap compensated torque applied to the target 222 can be determined based upon the torque estimate determined from the first signals and the improved gap measurement.

Exemplary technical effects of the methods, systems, and devices described herein include, by way of non-limiting example, improved gap estimation for compensation of torque measurements. Integration of one or more proximity sensors into a force sensing system (e.g., a torque sensing system) can reduce error in torque measurements due to electromagnetic runout of the target and/or loads applied to the target. Without correcting the proximity signal, the residual error due to electromagnetic runout of the target and any load applied to the target can be as high as about ±40% of the full-scale torque signal. For context, many torque sensing applications can require residual errors of about ±5% of the full-scale torque signal. Thus, the ability to provide an improved proximity signal can help to realize this desired accuracy.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A magnetostrictive sensor, comprising:
   a sensor head including,
      a driving pole having a driving coil coupled thereto that is configured to generate magnetic fluxes in response to a driving current;
      two magnetic sensors coupled to respective sensing poles and each configured to output a first signal based at least upon first magnetic fluxes and second magnetic fluxes sensed by the two magnetic sensors, the first sensed magnetic fluxes resulting from interaction of the generated magnetic fluxes with a target, a gap between the sensor head and the target and the second sensed magnetic fluxes resulting from interaction of the generated magnetic fluxes with the gap; and
      a proximity coil coupled to the driving pole that is configured to output a second signal based at least upon the first magnetic fluxes, the second magnetic fluxes, and third magnetic fluxes sensed by the proximity coil, the third magnetic fluxes resulting from interaction of the generated magnetic fluxes with the gap; and
   a controller in electrical communication with the sensor head, the controller configured to,
      receive the first signals and the second signal,
      determine a third signal based upon the first signals and the second signal, wherein the third signal is a function of the gap, and
      determine a force applied to the target based upon the first signals and the third signal.

2. The sensor of claim 1, wherein the controller is configured to sum the first signals and determine the third signal based upon a difference between the sum of the first signals and the second signal.

3. The sensor of claim 2, wherein the force is a torque.

4. The sensor of claim 1, wherein the two magnetic sensors are arranged approximately symmetrically with respect to the driving pole.

5. The sensor of claim 1, wherein the third sensed magnetic flux is approximately independent of electromagnetic properties of the target.

6. The sensor of claim 1, wherein the second and third magnetic fluxes avoid impinging the target.

7. A proximity sensing method, comprising:
   generating magnetic fluxes that extend through a first region, a second region, and a third region, the first region including a target, a pair of first sensors, and a second sensor, the second region including the pair of first sensors and the second sensor, and the third region including the second sensor;
   measuring, by the pair of first sensors, a combination of the first magnetic fluxes resulting from interaction of the generated magnetic fluxes and the target and second magnetic fluxes resulting from interaction of the generated magnetic fluxes and a gap between the second sensor and the target; and
   measuring, by the second sensor, a combination of the first magnetic fluxes, the second magnetic fluxes, and third magnetic fluxes, the third magnetic fluxes resulting from interaction of the generated magnetic fluxes and the gap;
   wherein the second and third magnetic fluxes avoid impinging the target.

8. The method of claim 7, further including,
   determining the third magnetic fluxes based upon combination of the first and second magnetic fluxes measured by the pair of first sensors and the first, second, and third magnetic fluxes measured by the second sensor; and
   determining the gap based upon the third magnetic fluxes.

9. The method of claim 8, wherein the third magnetic flux is approximately independent of electromagnetic properties of the target.

10. The method of claim 7, wherein each of the first and second sensors are inductive sensors configured to output a signal based upon magnetic fields respectively extending therethrough.

11. The method of claim 7, wherein the pair of first sensors are positioned approximately symmetrically with respect to a source of the generated magnetic flux.

12. A sensing method, comprising:
   generating magnetic fluxes with a driving coil coupled to a driving pole of a magnetostrictive torque sensor;
   outputting, by two magnetic sensors coupled to respective sensing poles of the magnetostrictive sensor, first signals based at least upon first magnetic fluxes and second magnetic fluxes sensed by the two magnetic sensors, the first sensed magnetic fluxes resulting from interaction of the generated magnetic fluxes with a target, a gap between the magnetostrictive torque sensor and the target, and the two sensing poles and the second sensed magnetic fluxes resulting from interaction of the generated magnetic fluxes with the gap and the two sensing poles; and
   outputting, by a proximity coil coupled to the driving pole, a second signal based at least upon a combination of the first magnetic fluxes, the second sensed magnetic fluxes, and third magnetic fluxes sensed by the proximity coil, the third magnetic fluxes resulting from interaction of the generated magnetic fluxes with the gap;
   wherein the second and third magnetic fluxes avoid impinging the target.

13. The method of claim 12, further including,
   determining a torque applied to the target based upon the first signals;
   determining the gap based upon the first signals and the second signal; and
   adjusting the torque determined from the first signals based upon the gap determined from the first signals and the second signal.

14. The method of claim 13, wherein the force is a torque.

15. The sensor of claim 12, wherein the two magnetic sensors are arranged approximately symmetrically with respect to the driving pole.

16. The sensor of claim 12, wherein the third sensed magnetic flux results from interaction of the generated magnetic flux with the gap only.

* * * * *